Oct. 21, 1930.  E. B. CARNS  1,779,113
WIND EXPOSED SURFACE
Filed Aug. 1, 1929
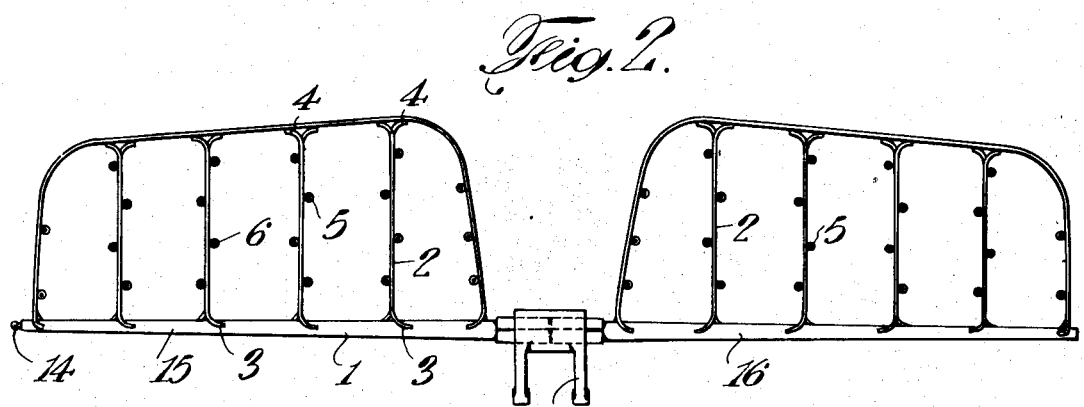
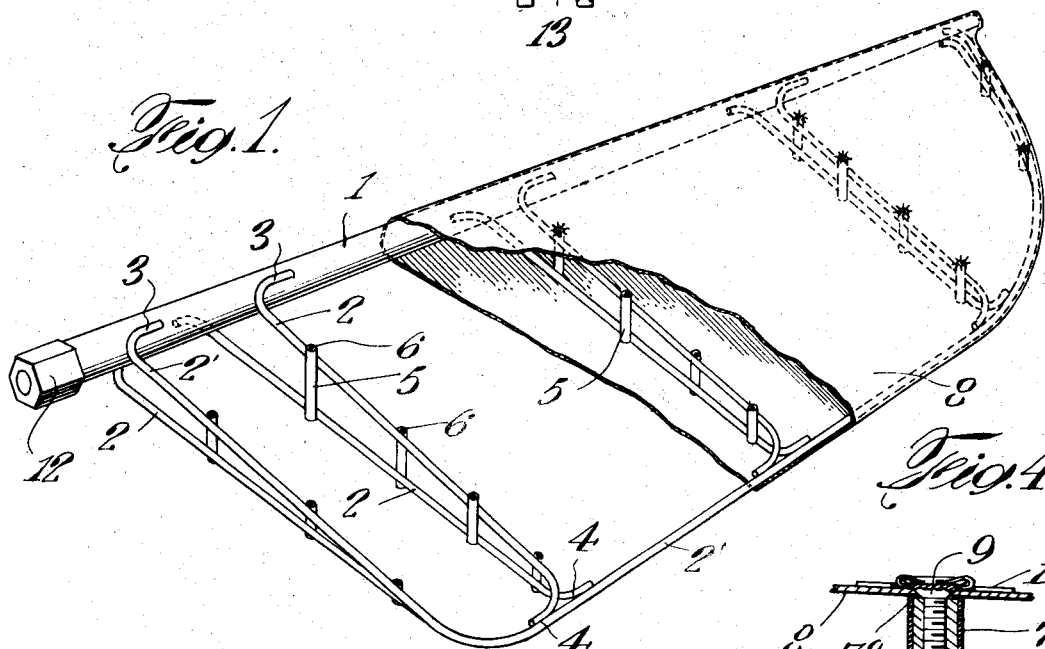
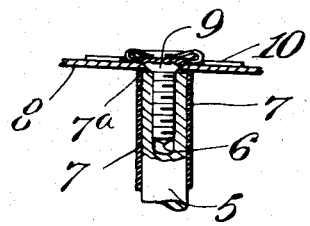
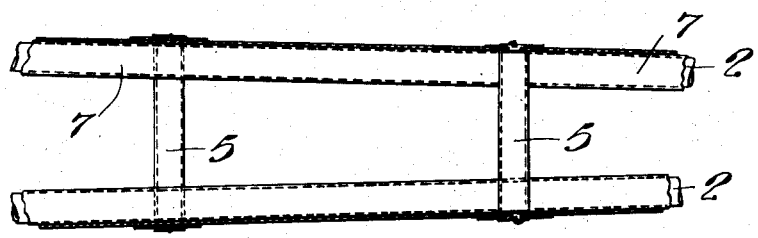
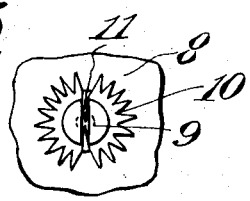
Inventor
Edmund B. Carns
By his Attorneys Patented Oct. 21, 1930

1,779,113

UNITED STATES PATENT OFFICE

EDMUND B. CARNS, OF NAUGATUCK, CONNECTICUT, ASSIGNOR TO CAIRNS DEVELOPMENT COMPANY, OF WILMINGTON, DELAWARE, A CORPORATION OF DELAWARE

WIND-EXPOSED SURFACE

Application filed August 1, 1929. Serial No. 382,619.

This invention relates to improvements in ailerons, rudders, wings and similar types of wind exposed surfaces.

One of the primary objects of my invention is to obtain a light, rigid frame construction and at the same time obtaining a means for attaching a covering to the frame structure.

Other objects and advantages of my invention will appear from the following description and drawings, in which, Figure 1 is a perspective view of my wind exposed surface with the covering partly broken away;

Figure 2 is a plan view of my structures adapted to act as an elevator;

Figure 3 is a detail showing the structural members;

Figure 4 is a detail showing the method of fastening the cover; and

Figure 5 is a plan view showing a detail of the cover fastening means.

Referring more particularly to the drawings in which like reference characters denote like parts, reference character 1 denotes a longitudinal spar member. This member is preferably of tapered tubular construction tapering in both external dimensions and in thickness of metal and may be of a type described in my copending application for airplane stabilizers, Serial No. 351,867 filed April 2, 1929. Members 2 and 2' which are preferably steel tubes are fastened to this spar member as shown at 3 by bending the ends of the tubes tangentially to the spar and welding. As can be seen from the drawing these tubular members 2 are spaced at intervals in pairs one above the other. The tangential bends on the outer edge of the wind exposed surface are turned inwardly along the spar. The pairs of internal transverse tubular members have the ends turned in opposite directions and welded. These tangential bends may be welded to the spar at such a point that they do not project beyond the vertical dimensions at a point at which they are welded, thus giving a smooth stream line effect.

The outer edge of the wind exposed surface is composed of the tubular members 2'. The transverse tubular members 2 are attached to the edge forming member also by tangential bends which are welded to the tube 2' forming the trailing edge of the wind exposed surface as shown at 4, Figure 1. These bends 4 are welded to the inner edge thus again giving a stream line effect. It is preferable to have the ends of the pairs of transverse members turned in opposite directions along the edge forming member so as to give a strong bond and large contacting surface. These pairs of transverse tubular members comprising upper and lower elements are further reenforced by the short vertical rods 5 which may be welded to them. The vertical rods fastened to the edge forming member 2' of the wind exposed surface are placed on the inside and those on the internal transverse members 2 are placed on alternate sides. These rods 5 are drilled and threaded at both ends as shown at 6 of the broken section Figure 4. Their upper and lower ends are designed to lie in the contour of the wind exposed surface and are therefore of a constantly diminishing length as they approach a leading or trailing edge of the wind exposed surface.

The frame structure is then preferably coated by means of dipping or spraying with a resilient material such as rubber as shown at 7, Figures 3 and 4. After the resilient coating has been applied the frame is then covered, preferably with a metal sheet 8 of a material such as duralumin or other light alloy. A metal mesh or fabric cover of course, also may be used in place of the metal sheet covering. The covering material is fastened to the frame by means of the screws 9 and the washers 10 described in my copending application, Serial No. 181,303. These screws as described above are threaded into the ends of the rods 6 which act as structural elements on the transverse tubular members 2. After the screws have been put into place, they are firmly held in position by bending the tabs 11 of the washer 10 into the groove of the screw.

I have shown the end of the spar member 1, Figure 1, shaped in a hexagonal form as shown at 12. This end may then be placed into a corresponding socket in frame 13, Figure 2, which may be connected with a control system thus permitting movement of the elevators as shown in Figure 2. The two wind exposed surfaces as shown in Figure 2 may be rigidly held in position in the member 13 by means of a threaded rod 14 which passes through the tube 15 and screws into the tube 16. This type of construction is disclosed more completely in my application for airplane stabilizers, Serial No. 351,867.

This particular type of construction of wind exposed surfaces makes an exceedingly light and yet strong and rigid wind exposed surface which is of such strength that it does not require external bracings and as such may be used for a movable as well as a fixed surface. The resilient coating of rubber tends to deaden any metallic vibrations which might be set up by the machine or by the wind passing along the surface. The frame structure is also thus protected against corrosion. Furthermore, the resilient coating over the ends of the tubes 5 acts as gaskets or washers and thus give a firm bond between the cover and the frame.

I have described only a specific form of my invention. To those skilled in the art will be obvious that many modifications are possible without departing from the spirit of my invention. I therefore do not wish to be limited by the specific embodiment of my invention herein illustrated and described but only by the scope of the appended claims.

I claim:

1. A wind exposed surface comprising a spar member, an edge forming member, spaced pairs of upper and lower transverse members joining said spar and edge forming members, vertical members joining said upper and lower transverse members, and a cover fastened to said vertical members.

2. A wind exposed surface comprising a spar member, an edge forming member having ends bent tangential to said spar member and fastened thereto, spaced upper and lower transverse members joining said spar and edge forming member, vertical members connecting said transverse members and a cover fastened to said vertical members.

3. A wind exposed surface comprising a spar member, an edge forming member having ends bent tangential to said spar member and fastened thereto, spaced pairs of upper and lower transverse members, each of said transverse members having ends bent tangential to said spar and edge forming member respectively and fastened thereto, vertical members connecting said upper and lower transverse members, and a cover fastened to said vertical members.

4. A wind exposed surface comprising a tapering spar member, a tubular edge forming member, spaced pairs of upper and lower tubular transverse members, rods joining said upper and lower tubular transverse members and a cover fastened to said rods.

5. A wind exposed surface comprising a tapering spar member, a tubular edge forming member having tangentially bent ends welded to said spar, spaced pairs of upper and lower tubular transverse members having ends bent tangentially and welded to said spar and said edge forming member, rods welded to said transverse members, and a cover fastened to said rods.

6. A wind exposed surface comprising a spar member, rib members, edge members, the ends of said rib members having ends bent parallel to said spar and edge member and welded thereto, the ends of said edge member having ends bent parallel to said spar and welded thereto, and a covering material.

7. A wing exposed surface comprising a tapering tubular spar member, rib members, edge members, the ends of said rib members having ends bent parallel to said spar and edge member and welded thereto, the ends of said edge member having ends bent parallel to said spar and welded thereto, and a covering material.

8. In a wind exposed surface comprising a spar, ribs, edge members and cover, rib ends bent parallel to the spar and edge members and welded along the portion of parallelism.

9. In a wind exposed surface having spars, edge members, upper and lower ribs having ends bent parallel to said spar and edge members and welded thereto, transverse braces holding said ribs in spaced relationship and a cover for said wind exposed surface fastened to the ends of said braces.

In testimony whereof, I have signed my name to this specification this 29th day of July, 1929.

EDMUND B. CARNS.